US010942770B2

(12) United States Patent
Cui et al.

(10) Patent No.: US 10,942,770 B2
(45) Date of Patent: Mar. 9, 2021

(54) METHOD, DEVICE AND COMPUTER READABLE MEDIUM FOR ANALYZING AND RESPONDING TO A REQUEST CORRESPONDING TO A GPU TASK

(71) Applicant: Dell Products L.P., Round Rock, TX (US)

(72) Inventors: Wei Cui, Beijing (CN); Kun Wang, Beijing (CN); Junping Zhao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 16/243,526

(22) Filed: Jan. 9, 2019

(65) Prior Publication Data

US 2019/0220308 A1    Jul. 18, 2019

(30) Foreign Application Priority Data

Jan. 18, 2018  (CN) .......................... 201810049611.3

(51) Int. Cl.
*G06F 9/46* (2006.01)
*G06F 9/48* (2006.01)
*G06F 16/245* (2019.01)

(52) U.S. Cl.
CPC .......... *G06F 9/4881* (2013.01); *G06F 16/245* (2019.01)

(58) Field of Classification Search
CPC ............................ G06F 9/4881; G06F 16/245
See application file for complete search history.

(56) References Cited

U.S. PATENT DOCUMENTS

| 7,467,289 | B1* | 12/2008 | Garlick | G06F 9/485 |
| | | | | 712/228 |
| 10,275,851 | B1* | 4/2019 | Zhao | G06F 9/5044 |
| 2012/0249559 | A1* | 10/2012 | Khodorkovsky | G06F 1/3203 |
| | | | | 345/502 |

(Continued)

OTHER PUBLICATIONS

Wikipedia, "TensorFlow," https://en.wikipedia.org/wiki/TensorFlow, Dec. 16, 2018, 5 pages.

(Continued)

*Primary Examiner* — Wissam Rashid
(74) *Attorney, Agent, or Firm* — Ryan, Mason & Lewis, LLP (57) ABSTRACT

A client side method for processing a GPU task comprises: receiving a request for the GPU task from an application; determining whether the request relates to a query about an execution state of the GPU task; and in response to the request relating to the query, providing a positive acknowledgement for the query to the application, without forwarding the request to a machine that executes the GPU task. A server side method for processing a GPU task comprises: receiving a request for the GPU task from a machine, the request being irrelevant to a query about an execution state of the GPU task; determining whether processing of the request depends on a processing of a previous request; and in response to the processing of the request depending on the processing of the previous request, suspending the processing of the request until the processing of the previous request is completed.

20 Claims, 5 Drawing Sheets

(56) References Cited

U.S. PATENT DOCUMENTS

2014/0281615 A1* 9/2014 Panneer ................ G06F 1/3234
                                                          713/323
2017/0329729 A1* 11/2017 Chew ...................... G06F 13/24

OTHER PUBLICATIONS

Wikipedia, "Keras," https://en.wikipedia.org/wiki/Keras, Nov. 14, 2018, 2 pages.
deeplearning.net, "Theano at a Glance," http://deeplearning.net/software/theano/introduction.html, Nov. 21, 2017, 5 pages.

* cited by examiner

METHOD, DEVICE AND COMPUTER READABLE MEDIUM FOR ANALYZING AND RESPONDING TO A REQUEST CORRESPONDING TO A GPU TASK

RELATED APPLICATION(S)

The present application claims priority to Chinese Patent Application No. 201810049611.3, filed Jan. 18, 2018 and entitled "Method, Device and Computer Readable Medium for Processing GPU Task," which is incorporated by reference herein in its entirety.

FIELD

Embodiments of the present disclosure relate to the field of computers, and more specifically to a method, device and computer readable medium for processing a Graphics Processing Unit (GPU) task.

BACKGROUND

GPUs are now widely used and deployed as accelerators for many applications such as machine learning and deep learning applications because of their high performance. As the price of a GPU is very high, if users can only use their local GPU resources in a siloed way, the overall utilization of a GPU will be very low, and the costs will be very high. In this case, a GPU as a service (abbreviated as GPUaaS) is built. The GPUaaS provides the GPU function as a type of service by building a client-server model, thereby improving the overall utilization and reducing the costs.

However, a function efficiency of a GPU execution in a GPUaaS architecture is greatly different compared with that in a local GPU device because different functions have different behaviors and for some of the functions, a latency of the GPU execution in the GPUaaS architecture is possibly enlarged. Therefore, it is desirable to provide an improved scheme in a GPUaaS architecture to further improve its function efficiency.

SUMMARY

According to an example embodiment of the present disclosure, there is provided a scheme for processing a GPU task in a GPUaaS architecture.

In a first aspect of the present disclosure, there is provided a method of processing a GPU task. The method comprises: receiving a request for the GPU task from an application; determining whether the request relates to a query about an execution state of the GPU task; and in response to the request relating to the query, providing a positive acknowledgement for the query to the application, without forwarding the request to a machine that executes the GPU task.

In a second aspect of the present disclosure, there is provided a method of processing a GPU task. The method comprises: receiving a request for the GPU task from a machine, the request being irrelevant to a query about an execution state of the GPU task; and performing operations to which the request relates, comprising: determining whether a processing of the request depends on a processing of a previous request; and in response to the processing of the request depending on the processing of the previous request, suspending the processing of the request until the processing of the previous request is completed.

In a third aspect of the present disclosure, there is provided an electronic device. The electronic device comprises: a processing unit; and a memory having instructions stored thereon which, when executed by the processing unit, cause the electronic device to: receive a request for a GPU task from an application; determine whether the request relates to a query about an execution state of the GPU task; and in response to the request relating to the query, provide a positive acknowledgement for the query to the application, without forwarding the request to a machine that executes the GPU task.

In a fourth aspect of the present disclosure, there is provided an electronic device. The electronic device comprises: a processing unit; and a memory having instructions stored thereon which, when executed by the processing unit, cause the electronic device to: receive a request for a GPU task from a machine, the request being irrelevant to a query about an execution state of the GPU task; and performing operations to which the request relates, comprising: determining whether a processing of the request depends on a processing of a previous request; and in response to the processing of the request depending on the processing of the previous request, suspending the processing of the request until the processing of the previous request is completed.

In a fifth aspect of the present disclosure, there is provided a computer-readable medium having a computer program stored thereon which, when executed by a processor, performs the method according to the first aspect of the present disclosure.

In a sixth aspect of the present disclosure, there is provided a computer-readable medium having a computer program stored thereon which, when executed by a processor, performs the method according to the second aspect of the present disclosure.

It should be appreciated that the content described in this Summary is not intended to identify key features or essential features of embodiments of the present disclosure, nor is it intended to be used to limit the scope of the present disclosure. Other features of the present disclosure become apparent through the following depictions.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

DETAILED DESCRIPTION

Embodiments of the present disclosure will be described with reference to the drawings in detail. Although some embodiments of the present disclosure are shown in the drawings, it should be appreciated that the present disclosure can be implemented in various manners and should not be interpreted as limited to the implementations described herein. Conversely, these implementations are provided for a thorough and complete understanding of the present disclosure. It is to be understood that the drawings and implementations are only for the purpose of example, rather than to limit the scope of protection of the present disclosure.

In the depictions of the embodiments of the present disclosure, the term "includes" and its variants are to be read as open terms that mean "includes, but is not limited to." The term "based on" is to be read as "based at least in part on." The terms "one embodiment" and "an embodiment" are to be read as "at least one embodiment." The terms "first," "second," and the like may refer to different objects or the same objects. Other definitions, explicit and implicit, may be included below.

In the depictions of embodiments of the present disclosure, a term "machine" or "host" may be understood as any electronic device having a processor and a memory. The term "machine" or "host" may refer to a client or terminal device, or may also refer to a server device.

Figure 1:
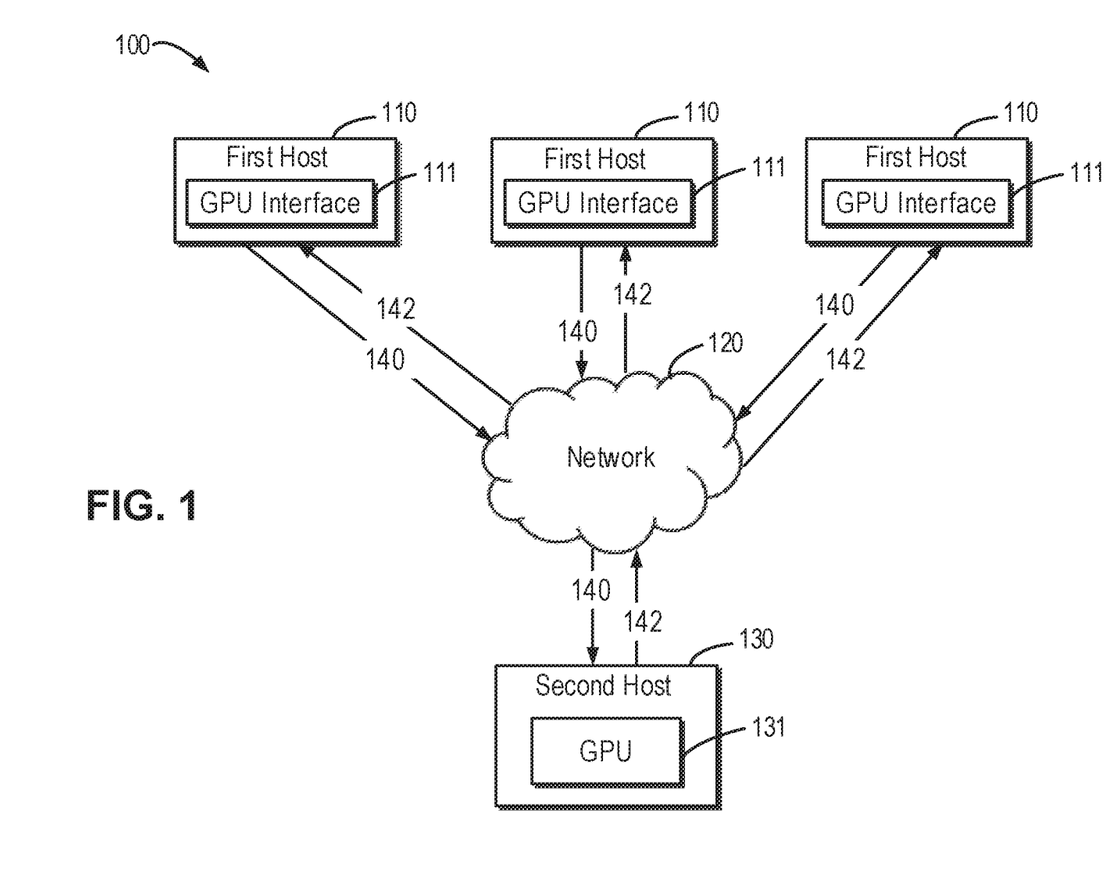
FIG. 1 illustrates a schematic diagram of an example GPUaaS architecture in which an embodiment of the present disclosure may be implemented.

In the text herein, to facilitate description, "machine" and "host" may be used interchangeably. As mentioned above, the GPUaaS provides the GPU function as a type of service by building the client-server model. This will be described in detail below with reference to FIG. 1. FIG. 1 illustrates a schematic diagram of an example GPUaaS architecture 100 in which an embodiment of the present disclosure may be implemented. As shown in FIG. 1, the architecture 100 comprises one or more first hosts 110 each having a GPU interface 111, a network 120, and a second host 130 having a GPU 131. The first host 110 does not have a GPU and only has the GPU interface 111 through which a GPU service may be requested, whereas the second host 130 may provide the GPU service, namely, process a GPU task, e.g., execute a GPU computation. The network 120 may be any computer network which is known in the art or to be developed in the future, such as the Internet, a local area network (LAN), a metropolitan area network and an intranet. In the architecture 100, the first host 110 may send a request for processing a GPU task to the second host 130 via the network 120 (as designated by 140 in FIG. 1), and receive a processing result of the GPU task from the second host 130 (as designated by 142 in FIG. 1).

In the architecture 100, the first host 110 may be considered as a client, and the second host may be considered as a server. In an embodiment of the present disclosure, the client-server model may perform the above interaction process by virtue of a remote procedure call (RPC) protocol or similar protocol. An RPC channel is established between the client and server and used to transmit the request for processing the GPU task or the processing result of the GPU task, for example, in the form of a list of GPU commands. Each of the commands represents a corresponding GPU function, for example, invocation of an application programming interface (API) of a Compute Unified Device Architecture (CUDA), such as memcpyH2D, runGPUfunction, memcpyD2H and the like.

However, the present inventors have discovered in studies of mainstream GPU applications/frameworks such as TensorFlow, Keras and Theano that the current command-driven manner has the following problems: the function of a GPU execution in a GPUaaS architecture such as the architecture 100 is greatly different compared with that in a local GPU device. The present inventors have determined that this is because different GPU applications have different behaviors, for example a synchronization mode, a polling query mode and an interruption mode, and for some GPU applications, an execution latency in the GPUaaS architecture increases, which is unbearable in the case of poor network conditions.

In view of this, the basic idea of an embodiment of the present disclosure lies in using a data-driven manner in place of the above command-driven manner to implement the processing of the GPU task in the GPUaaS architecture. Usually, in the command-driven solution, a GPU command from an application is transmitted via an RPC channel to a machine having a GPU function, and executed at the machine. In the data-driven solution of an embodiment of the present disclosure, it is feasible to track a data (namely, task) execution pipeline, and perform synchronization of a command and data only when necessary, thereby increasing datapath overlaps and reducing an overall latency, while decreasing an unnecessary network transmission and reducing a network load. This will be described in more detail below with reference to FIG. 2 to FIG. 4.

Figure 2:
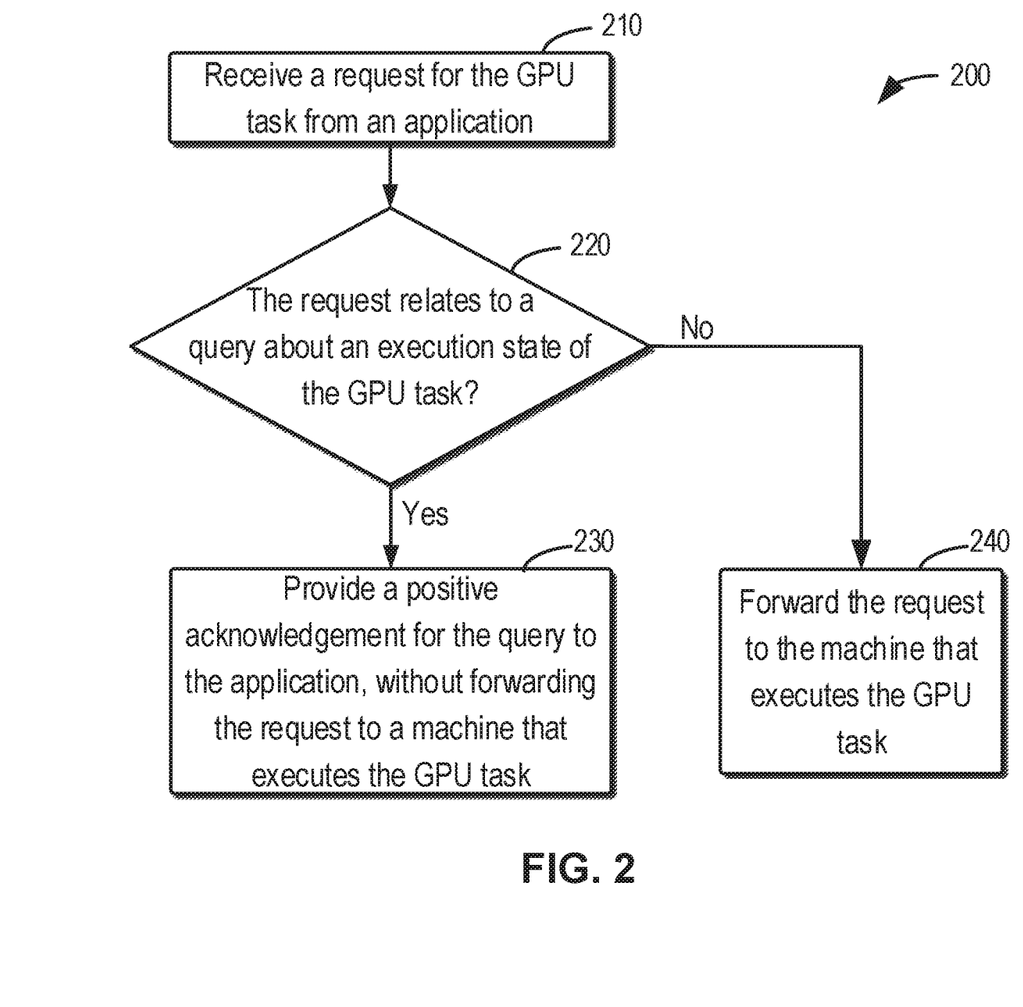
FIG. 2 illustrates a flow chart of a method implemented at a client side for processing a GPU task according to an embodiment of the present disclosure.

FIG. 2 illustrates a flow chart of a method 200 implemented at a client side for processing a GPU task according to an embodiment of the present disclosure. The method 200 may be implemented at a machine (e.g., the first host 110 in FIG. 1) serving as a client demanding a GPU service.

As shown in FIG. 2, at block 210, a request for the GPU task is received from an application. For example, the application at the first host 110 may be accelerated by virtue of a GPU. In this case, the application may send the request for the GPU task to the first host 110, and correspondingly, the first host 110 receives the request from the application. According to an embodiment of the present disclosure, the GPU task may be in the form of a list of commands such as memcpyH2D, runGPUfunction, memcpyD2H and the like.

According to an embodiment of the present disclosure, the request may involve at least one of the following: a synchronization mode, a polling query mode and an interruption mode, which depends on the application's control mechanism for the GPU task. For example, in the synchronization mode, the GPU task is executed in a serialized way, wherein one GPU task is completed before a GPU task that follows will be executed, namely, the command and task execution are synchronized. An example of the application in this mode is a Theano application.

For example, in the polling query mode, it is feasible to check in an asynchronized manner whether a GPU task is completed without blocking the application thread. An example of the application in this mode is a TensorFlow application. For example, in the interruption mode, it is feasible to set an asynchronized callback/handler to request a notification when a GPU task is complete. This mode is used in most applications of the CUDA. It should be appreciated that the request may involve any other modes which are known in the art or to be developed in the future, and is not limited to the above-listed modes.

At block 220, it is determined whether the request relates to a query about an execution state of the GPU task. According to an embodiment of the present disclosure, depending on the control mechanisms of the application, the GPU task may involve different functions, for example, execution of the GPU task, the query about the execution state of the GPU task, and acquisition for an execution result of the GPU task. For example, the first host 110 may, according to a type of a command included in the request, determine whether the request received at block 210 relates to the query about the execution state of the GPU task. In an embodiment, for example in the TensorFlow application in the polling query mode, if the request relates to for example the semantic "whether task A is done?", it may be determined that the request relates to the query about the execution state of the GPU task. In another embodiment, for example in the CUDA application in the interruption mode, if the request relates to for example the semantic "when task A is done, please callback handler1", it may be determined that the request relates to the query about the execution state of the GPU task. In brief, according to an embodiment of the present disclosure, so long as the request relates to the execution state of the GPU task instead of data itself of the GPU task (e.g., data needed for the execution of the task, the result data obtained after the execution of the task, and so on), it is determined that the request relates to the query about the execution state of the GPU task. It should be appreciated that in the context of an embodiment of the present disclosure, examples of the request relating to a specific semantic are only illustrative, the present disclosure is not limited to these examples, and other semantics or requests in other forms are also possible.

If it is determined at block 220 that the request relates to the query about the execution state of the GPU task, the process proceeds to block 230. At block 230, a positive acknowledgement for the query is provided to the application, without forwarding the request to the machine executing the GPU task. In an embodiment, for example, if the request relates to for example the semantic "whether task A is done?", the first host 110 may directly return the semantic "already done" to the application, without forwarding the request to the second host 130 through the RPC channel. In another embodiment, for example, if the request relates to for example the semantic "when task A is done, please callback handler1", the first host 110 may directly return the semantic "please execute handler1 since task A is already done" to the application, without forwarding the request to the second host 130 through the RPC channel. In other words, according to an embodiment of the present disclosure, so long as the request relates to the execution state of the GPU task instead of data itself of the GPU task (e.g., data needed for the execution of the task, the result data obtained after the execution of the task, and so on), the request is not forwarded to the machine that executes the GPU task, and a positive acknowledgement is directly provided.

If it is determined at block 220 that the request does not involve the query about the execution state of the GPU task, the process proceeds to block 240. At block 240, the request is forwarded to the machine that executes the GPU task.

According to the embodiment of the present disclosure described with reference to FIG. 2, regarding the request relating to the execution state and not relating to the data itself, the request is not forwarded to the machine that executes the GPU task, and the positive acknowledgement is directly provided. Thus, an unnecessary network transmission is decreased and a network load is reduced. Meanwhile, due to asynchronization of command and data execution, the waiting latency of the application is reduced.

Figure 3:
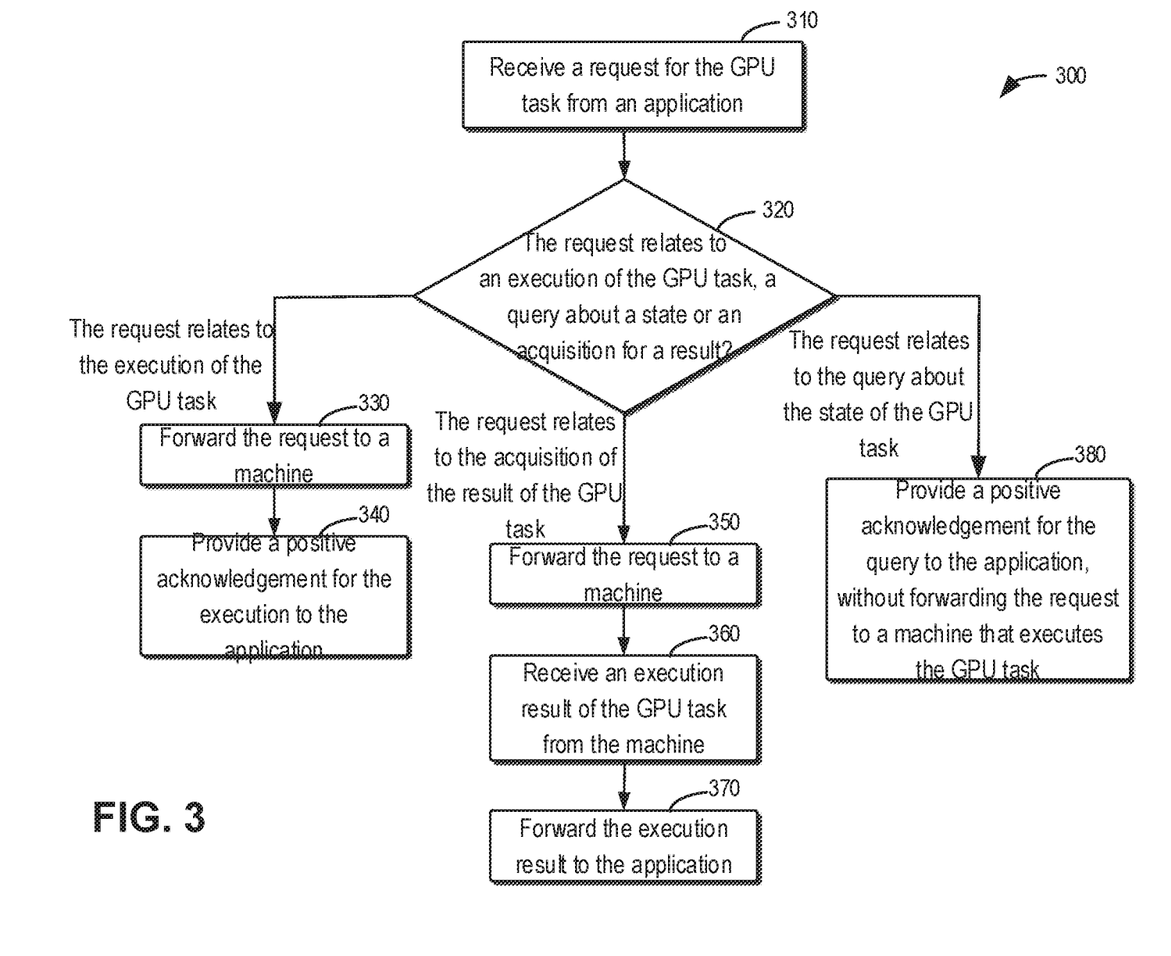
FIG. 3 illustrates a flow chart of a method implemented at a client side for processing a GPU task according to another embodiment of the present disclosure.

Reference is made below to FIG. 3 which illustrates a process for processing a GPU task according to another embodiment of the present disclosure. FIG. 3 illustrates a flow chart of a method 300 implemented at a client side for processing a GPU task according to another embodiment of the present disclosure. For example, the method 300 may also be implemented at the first host 110 shown in FIG. 1.

As shown in FIG. 3, at block 310, a request for the GPU task is received from the application. This operation is similar to the operation described above with reference to block 210 in FIG. 2, and therefore will not be further described.

At block 320, determination is performed as to whether the request relates to an execution of the GPU task, a query about an execution state or an acquisition for an execution result. For example, the first host 110 may, according to a type of a command included in the request, determine which operation for the GPU task the request received at block 310 relates to. When it is determined that the request relates to the execution for the GPU task, for example, the semantic "please execute task A", the process proceeds to block 330.

At block 330, the request is forwarded to the machine that executes the GPU task. For example, the first host 110 may send the request to the second host 130 via the network 120 by virtue of the RPC channel, so that the second host 130 performs the operation to which the request relates.

At block 340, a positive acknowledgement for the execution is provided to the application. For example, the first host 110, with regard to the request relating to the semantic "please execute task A", may automatically provide a positive acknowledgement "already executed." The operation of the block 340 may be performed before, after or at the same time as the operation of block 330.

When it is determined at block 320 that the request relates to the acquisition for the execution result of the GPU task, for example, the semantic "please return a result of task A", the process proceeds to block 350. At block 350, the request is forwarded to the machine that executes the GPU task. This operation is similar to the operation of block 330, and therefore will not be further described.

At block 360, an execution result of the GPU task is received from the machine. For example, the first host 110 may receive the execution result of task A from the second host 130 via the network 120 by virtue of the RPC channel. At block 370, the execution result is forwarded to the application, thereby acknowledging the above request.

When it is determined at block 320 that the request relates to the query about the execution state of the GPU task, the process proceeds to block 380, at which a positive acknowledgement for the query is provided to the application, without forwarding the request to the machine that executes the GPU task. This operation of block 380 is similar to the operation described above with reference to block 230 in FIG. 2, and therefore will not be further described.

As compared with the embodiment described with reference to FIG. 2, the embodiment of the present disclosure described above with reference to FIG. 3 shows that regarding the request relating to the query about the state, a positive acknowledgement is directly provided and the request is not forwarded to the machine that executes the GPU task; regarding the request relating to the execution of the GPU task, a positive acknowledgement is also directly provided but the request is forwarded to the machine that executes the GPU task; and only regarding the request relating to the execution result of the GPU task, synchronized processing of the machine is awaited, thereby decreasing unnecessary network transmission, reducing the network load, and reducing the latency.

So far, the method which is implemented at a client side for processing a GPU task has been described with reference to FIG. 2 and FIG. 3. Corresponding to the client side method, according to an embodiment of the present disclosure, there is also provided a method implemented at a server side for processing a GPU task. The server side method is described in detail below with reference to FIG. 4.

Figure 4:
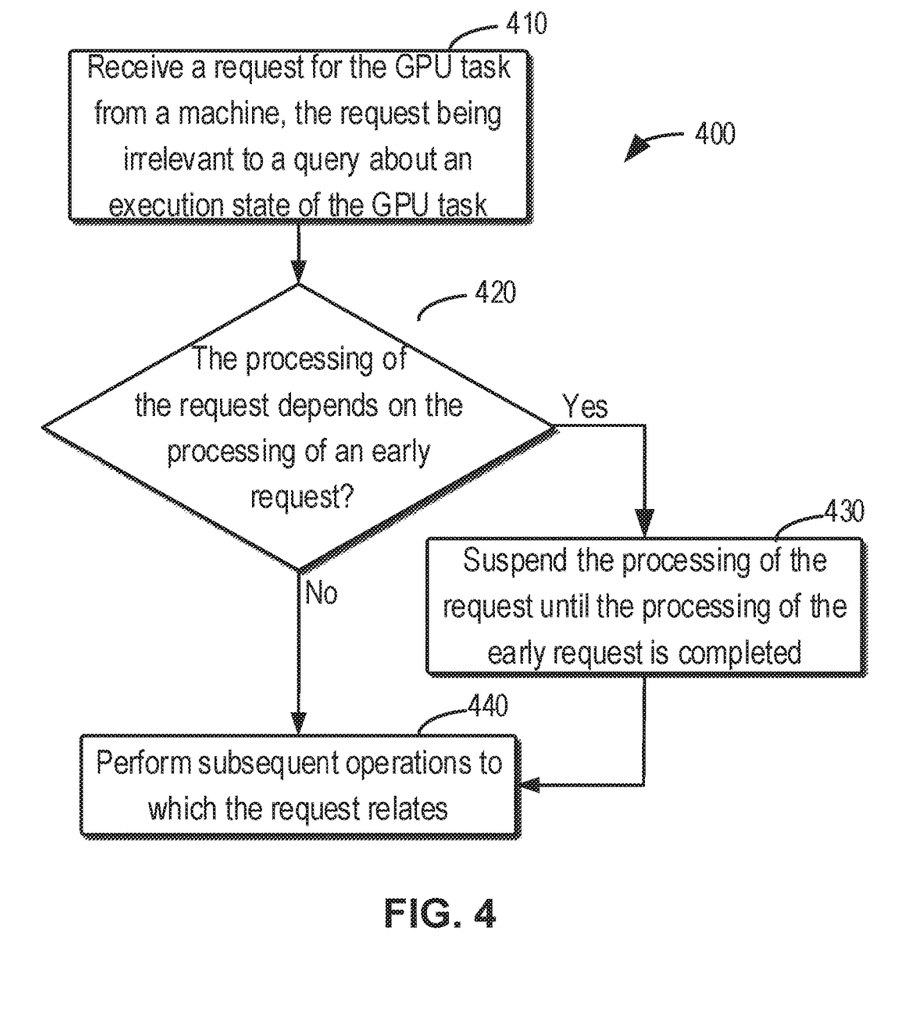
FIG. 4 illustrates a flow chart of a method implemented at a server side for processing a GPU task according to an embodiment of the present disclosure.

FIG. 4 illustrates a flow chart of a method 400 implemented at a server side for processing a GPU task according to an embodiment of the present disclosure. The method 400 may be implemented at a machine (e.g., the second host 130 in FIG. 1) serving as a server providing a GPU service.

As shown in FIG. 4, at block 410, a request for the GPU task is received from the machine, and the request is irrelevant to a query about an execution state of the GPU task. As stated above with reference to block 240 in FIG. 2, in the case that the request does not involve the query about the execution state of the GPU task, the first host 110 needs to forward the request to the second host 130 via the network 120. Correspondingly, the second host 130 will receive the request from the first host 110. According to an embodiment of the present disclosure, the request may involve data itself of the GPU task, for example, data needed for the execution of the task, the result data obtained after the execution of the task, and so on. For example, a command relating to the semantic "please execute task A", a command relating to the semantic "please return a result of task A" and the like. It should be appreciated that in the context of an embodiment of the present disclosure, examples of the request relating to a specific semantic are only illustrative, the present disclosure is not limited to these examples, and other semantics or requests in other forms are also possible.

According to an embodiment of the present disclosure, the request may involve at least one of the following: a synchronization mode, a polling query mode and an interruption mode. Regarding details of this aspect, please refer to the above similar portion described with reference to block 210 in FIG. 2.

At block 420, it is determined whether a processing of the received request depends on a processing of a previous request. In an embodiment, for example, regarding the request received at block 410 and having the semantic "please return a result of task A", the second host 130 may determine that the processing of the request depends on for example the processing of the previous request having the semantic "please execute task A." Only after the execution of task A is completed can a result of task A be returned. In another embodiment, for example, regarding a request received at block 410 and having the semantic "please execute task A", the second host 130 may determine that the processing of the request does not depend on the processing of the previous request, and instead the request is executed separately.

When it is determined at block 420 that the processing of the request depends on the processing of the previous request, the process proceeds to block 430. At block 430, the processing of the request is suspended until the processing of the previous request is completed. According to an embodiment of the present disclosure, when the processing of the previous request is completed, subsequent operations to which the request relates are executed, as shown in block 440. When it is determined at block 420 that the processing of the request does not depend on the processing of the previous request, the process proceeds to block 440, at which the subsequent operations to which the request relates are directly executed.

According to an embodiment of the present disclosure, the machine that executes the GPU task does not receive a request relating to the query about the execution state of the GPU task, and correspondingly only receives a request relating to the data itself of the GPU task, for example, relating to data needed for the execution of the GPU task, result data of the execution of the GPU task and so on. Therefore, as compared with a conventional solution, the solution of the present disclosure reduces unnecessary network transmission and decreases the network load. In addition, due to the interception processing at the client side for the request (namely, command), the command and data execution at the server side become asynchronous, so it is necessary to synchronize the command with the data execution at the server side, to output the desired data.

According to the embodiments described with reference to FIG. 2 through FIG. 4, the data-driven GPUaaS architecture may be implemented. Only transmitting, through the network, the request relating to the data itself of the GPU task, and intercepting the request relating to the query about the execution state of the GPU task may reduce unnecessary network transmission and decrease the network load. In addition, the latency for synchronization is reduced because asynchronous operation between the command and data execution is allowed and synchronized operation is performed only when necessary.

Figure 5:
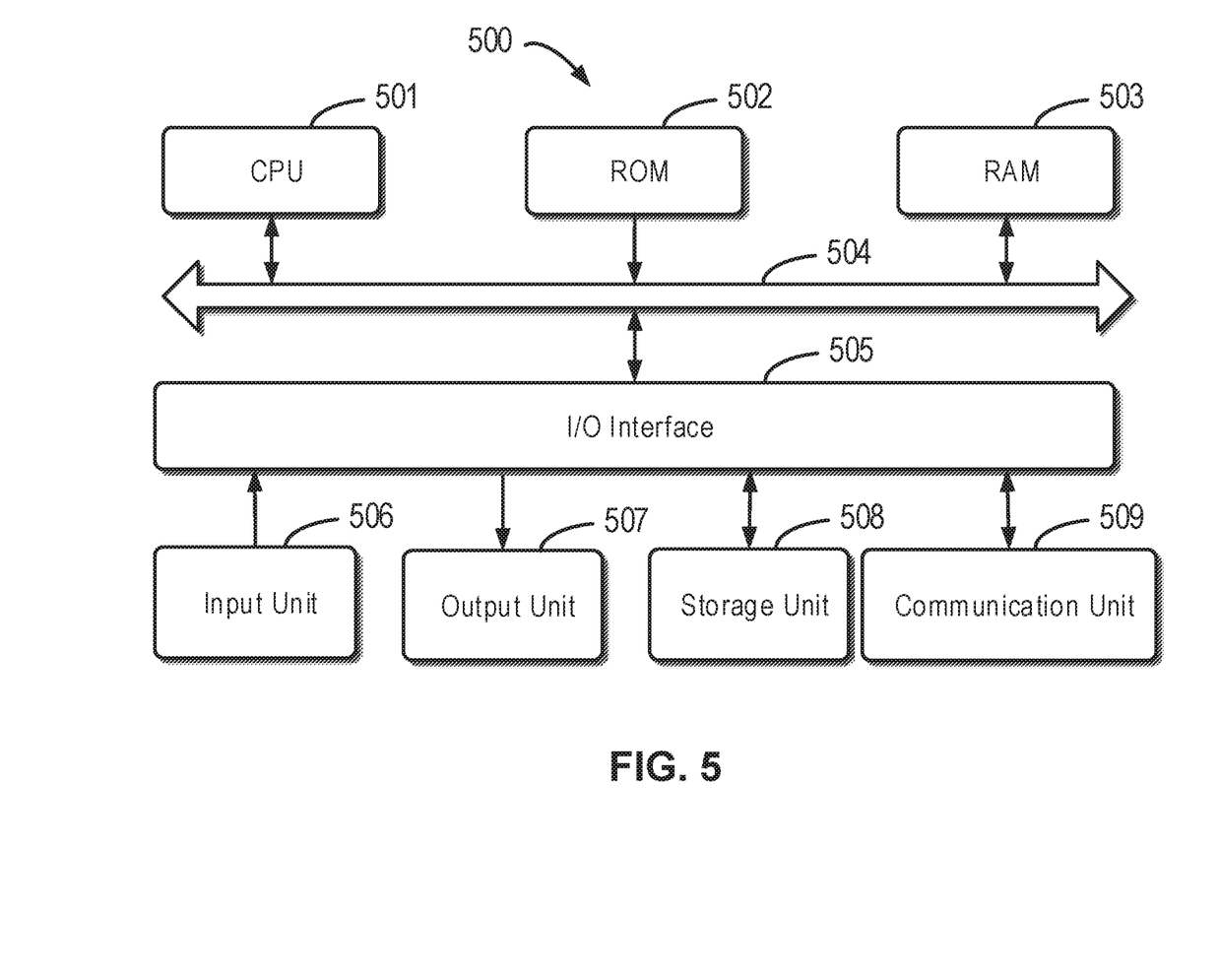
FIG. 5 illustrates a block diagram of an electronic device that may implement an embodiment of the present disclosure.

FIG. 5 illustrates a block diagram of an electronic device 500 that may implement an embodiment of the present disclosure. The device 500 may be used to implement the first hosts 110 and the second host 130 in FIG. 1. As shown in the figure, the device 500 comprises a central processing unit (CPU) 501 which is capable of performing various processes in accordance with computer program instructions stored in a read only memory (ROM) 502 or computer program instructions loaded from a storage unit 508 to a random access memory (RAM) 503. In the RAM 503 are stored various programs and data as required by operation of the apparatus 500. The CPU 501, the ROM 502 and the RAM 503 are connected to one another via a bus 504. An input/output (I/O) interface 505 is also connected to the bus 504.

The following components in the device 500 are connected to the I/O interface 505: an input unit 506 such as a keyboard, a mouse, or the like; an output unit 507 such as various types of displays and speakers; the storage unit 508 such as a magnetic disk or optical disk; and a communication unit 509 such as a network card, a modem, a wireless communication transceiver or the like. The communication unit 509 allows the device 500 to exchange information/data with other devices via a computer network such as the Internet and/or various telecommunication networks.

The processing unit 501 performs various method and processes described above, for example methods 200, 300 and/or 400. For example, in some embodiments, the method 200, 300 and/or 400 may be implemented as a computer software program, which is tangibly contained in a machine-readable medium, for example the storage unit 508. In some embodiments, part or all of the computer program may be loaded and/or installed on the device 500 via ROM 502 and/or communication unit 509. When the computer program is loaded in the RAM 503 and executed by CPU 501, one or more steps of the methods 200, 300 and/or 400 described above may be executed. Alternatively, in other embodiments, the CPU 501 may be configured to execute methods 200, 300 and/or 400 in any other proper manners (e.g., by virtue of a firmware).

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A method of processing a Graphics Processing Unit (GPU) task, comprising:
   receiving on a first machine a request corresponding to the GPU task from an application running on the first machine;
   wherein the first machine comprises a GPU interface used at least in part for requesting execution of the GPU task from a second machine remote from the first machine; and
   wherein the second machine comprises a GPU;
   determining on the first machine whether the request from the application relates to a query about an execution state of the GPU task on the second machine; and
   in response to the request from the application relating to the query, providing a positive acknowledgement for the query to the application, without forwarding the request from the application to the second machine executing the GPU task;
   wherein the positive acknowledgment for the query indicates the execution of the GPU task.

2. The method according to claim 1, further comprising:
   in response to the request from the application relating to the execution of the GPU task, forwarding the request from the application to the second machine; and
   providing a positive acknowledgement for the execution to the application.

3. The method according to claim 1, further comprising:
   in response to the request from the application relating to an acquisition for an execution result of the GPU task, forwarding the request from the application to the second machine;
   receiving the execution result of the GPU task from the second machine; and
   forwarding the execution result to the application.

4. The method according to claim 1, wherein the request from the application relates to at least one of the following: a synchronization mode, a polling query mode and an interruption mode.

5. A method of processing a Graphics Processing Unit (GPU) task, comprising:
   receiving on a second machine a request corresponding to the GPU task from a first machine, the request being irrelevant to a query about an execution state of the GPU task; and
   performing operations on the second machine to which the request relates, comprising:
      determining whether a processing of the request depends on a processing of a previous request; and
      in response to the processing of the request depending on the processing of the previous request, suspending the processing of the request until the processing of the previous request is completed;
   wherein the first machine comprises a GPU interface used at least in part for requesting execution of the GPU task from the second machine;
   wherein the second machine is remote from the first machine and comprises a GPU; and
   wherein requests relating to queries about the execution state of the GPU task are processed by the first machine to provide positive acknowledgements for the queries without the requests relating to the queries being forwarded by the first machine to the second machine.

6. The method according to claim 5, wherein performing the operations further comprises:
   in response to the request relating to the execution of the GPU task, performing the GPU task to obtain an execution result of the GPU task.

7. The method according to claim 5, wherein performing the operations further comprises:
   in response to the request relating to an acquisition for an execution result of the GPU task, sending the execution result to the first machine.

8. The method according to claim 5, wherein the request relates to at least one of the following: a synchronization mode, a polling query mode, and an interruption mode.

9. An electronic device, comprising:
   a processing unit; and
   a memory having instructions stored thereon which, when executed by the processing unit, cause the electronic device to:
      receive a request corresponding to a Graphics Processing Unit (GPU) task from an application running on the electronic device;
      wherein the electronic device further comprises a GPU interface used at least in part for requesting execution of the GPU task from a machine remote from the electronic device; and wherein the machine comprises a GPU;
determine whether the request from the application relates to a query about an execution state of the GPU task on the machine; and
in response to the request from the application relating to the query, provide a positive acknowledgement for the query to the application, without forwarding the request from the application to the machine executing the GPU task;
wherein the positive acknowledgment for the query indicates the execution of the GPU task.

10. The device according to claim 9, wherein the memory has further instructions stored thereon which, when executed by the processing unit, cause the electronic device to:
in response to the request from the application relating to the execution of the GPU task, forward the request from the application to the machine; and
provide a positive acknowledgement for the execution to the application.

11. The device according to claim 9, wherein the memory has further instructions stored thereon which, when executed by the processing unit, cause the electronic device to:
in response to the request from the application relating to an acquisition for an execution result of the GPU task, forward the request from the application to the machine;
receive the execution result of the GPU task from the machine; and
forward the execution result to the application.

12. The device according to claim 9, wherein the request from the application relates to at least one of the following: a synchronization mode, a polling query mode, and an interruption mode.

13. An electronic device, comprising:
a processing unit; and
a memory having instructions stored thereon which, when executed by the processing unit, cause the electronic device to:
receive a request corresponding to a Graphics Processing Unit (GPU) task from a machine, the request being irrelevant to a query about an execution state of the GPU task; and
performing operations to which the request relates, comprising:
determining whether a processing of the request depends on a processing of a previous request; and
in response to the processing of the request depending on the processing of the previous request, suspending the processing of the request until the processing of the previous request is completed;
wherein the machine comprises a GPU interface used at least in part for requesting execution of the GPU task from the electronic device;
wherein the electronic device is remote from the machine and further comprises a GPU; and
wherein requests relating to queries about the execution state of the GPU task are processed by the machine to provide positive acknowledgements for the queries without the requests relating to the queries being forwarded by the machine to the electronic device.

14. The device according to claim 13, wherein the memory has further instructions stored thereon which, when executed by the processing unit, cause the electronic device to:
in response to the request relating to the execution of the GPU task, perform the GPU task to obtain an execution result of the GPU task.

15. The device according to claim 13, wherein the memory has further instructions stored thereon which, when executed by the processing unit, cause the electronic device to:
in response to the request relating to an acquisition for an execution result of the GPU task, send the execution result to the machine.

16. The device according to claim 13, wherein the request relates to at least one of the following: a synchronization mode, a polling query mode, and an interruption mode.

17. A non-transitory computer-readable medium having a computer program stored thereon which, when executed by a processor, performs the steps of:
receiving on a first machine a request corresponding to a Graphics Processing Unit (GPU) task from an application running on the first machine;
wherein the first machine comprises a GPU interface used at least in part for requesting execution of the GPU task from a second machine remote from the first machine; and
wherein the second machine comprises a GPU;
determining on the first machine whether the request from the application relates to a query about an execution state of the GPU task on the second machine; and
in response to the request from the application relating to the query, providing a positive acknowledgement for the query to the application, without forwarding the request from the application to the second machine executing the GPU task;
wherein the positive acknowledgment for the query indicates the execution of the GPU task.

18. A non-transitory computer-readable medium having a computer program stored thereon which, when executed by a processor, performs the steps of:
receiving on a second machine a request corresponding to a Graphics Processing Unit (GPU) task from a first machine, the request being irrelevant to a query about an execution state of the GPU task; and
performing operations on the second machine to which the request relates, comprising:
determining whether a processing of the request depends on a processing of a previous request; and
in response to the processing of the request depending on the processing of the previous request, suspending the processing of the request until the processing of the previous request is completed;
wherein the first machine comprises a GPU interface used at least in part for requesting execution of the GPU task from the second machine;
wherein the second machine is remote from the first machine and comprises a GPU; and
wherein requests relating to queries about the execution state of the GPU task are processed by the first machine to provide positive acknowledgements for the queries without the requests relating to the queries being forwarded by the first machine to the second machine.

19. The non-transitory computer-readable medium of claim 18, wherein the computer program further performs the step of performing the GPU task to obtain an execution result of the GPU task in response to the request relating to the execution of the GPU task.

20. The non-transitory computer-readable medium of claim 17, wherein the computer program further performs the steps of:

in response to the request from the application relating to the execution of the GPU task, forwarding the request from the application to the second machine; and
providing a positive acknowledgement for the execution to the application.

* * * * *